INVENTORS
YLO E. STAHLER
EDWARD O. VALENTINE

BY *Harry A. Herbert Jr*

ATTORNEY

United States Patent Office 3,529,794
Patented Sept. 22, 1970

3,529,794
RADAR RESPONSIVE PARACHUTE
Ylo E. Stahler, 3605 Stoneview Court 45429, and Edward O. Valentine, 2105 Meriline Ave. 45420, both of Dayton, Ohio
Filed Nov. 6, 1968, Ser. No. 773,838
Int. Cl. B64d 17/00
U.S. Cl. 244—142               3 Claims

ABSTRACT OF THE DISCLOSURE

The auxiliary chute of a parachute assembly is equipped with panels of wire mesh that form themselves into corner reflectors when the parachute opens. The reflectors function to send back radar echo signals to a signal-transmitting device carried by a rescue craft. The intervening distance between the open chute and the rescue craft thereupon becomes known to rescue personnel.

BACKGROUND OF THE INVENTION

Field of the invention

This invention is in the field of reflective rescue devices.

Description of the prior art

The use of a parachute by a crew member forced to eject from a distressed aircraft has long been known and the heroic work done by rescue crews in picking up downed crew members has become legend over the past few years. Rescue aircraft are generally in the air at all times in areas of hazardous flight. The rescue aircraft are generally equipped with sophisticated radar equipment. However, the use of the radar equipment at its fullest potential has not been realized because, after a pilot and crew members are forced to eject, radar contact with them is lost. Standard parachutes, being nonmetallic, do not provide sufficient echo area to be detected by the radar equipment of the rescue aircraft. Thus, knowledge of the position of the distressed aircraft at the time of the ejection, knowledge of weather conditions such as wind direction and velocity, and visual contact have been the primary means used by rescue personnel in locating downed personnel for pickup. If personnel are down in jungle areas, visual contact between downed personnel and the rescue personnel is quite often impossible due to the jungle canopy. In such a case, data on the exact location of the downed personnel supplied by means other than visual is an absolute necessity if the downed personnel are to be rescued. In order to be picked up in heavily wooded areas it has generally been necessary for the downed personnel to signal the rescue personnel by some means such as smoke. In military situations where there may be enemy troops in the area of the downed personnel, the use of smoke as a signalling device is hazardous because it is visible to the enemy troops as well as to the rescue personnel. Thus, elimination of the need for such signals or delaying the need for them as long as possible is desirable.

SUMMARY OF THE INVENTION

This invention enables personnel aboard rescue aircraft equipped with radar equipment to remain in radar contact with personnel forced to eject from a distressed aircraft during the time lapse between ejection and touchdown. The invention does so by providing a metallic reflecting device attached to the suspension lines of a parachute in such a manner that a four-corner reflective structure is created upon parachute deployment. The four-corner structure provides a large radar cross section for any aspect angle. A lightweight metallic mesh is utilized. Deployment of the mesh provides to the rescue crew a means of locating a parachuting pilot or crew member who is beyond visual sight by providing said rescue aircraft with the azimuth and range of the parachuting pilot or crew member.

DESCRIPTION OF THE PREFERRED EMBODIMENTS

Figure 1:
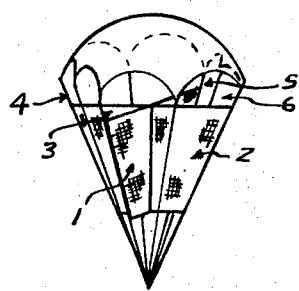
FIG. 1 shows a side view of deployed mesh assuming a configuration of four corner reflectors.

In practicing this invention, two panels of wire mesh or metallized fiber mesh (1 and 2—FIG. 1) are fastened in a crossed manner to four main shroud lines (3, 4, 5, and 6—FIG. 1) of a parachute. When the parachute opens the mesh assumes a configuration of four corner reflectors as shown in FIG. 1.

Figure 2:
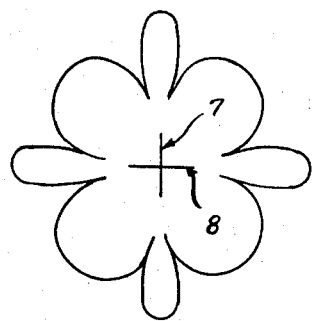
FIG. 2 displays the reflection pattern of a four corner structure.

The outstanding advantage of this invention is the simplicity in which the crossed panels form corner reflectors. A corner reflector represents a strong radar target because of the inherent backscattering gain which equals nearly that of a flat plate of the same outline dimensions. Crossing the panels creates four corner reflectors, each facing a different azimuth quadrant. FIG. 2 displays the reflection of a four corner structure where 7 and 8 symbolize crossed mesh panels and, as can readily be seen, such a structure provides strong backscattering for all azimuthal directions with the exception of a few narrow sectors. Since the parachute descends with swaying and turning, rather than in a rigid attitude, the few narrow sectors of weak backscattering are of no consequence.

Figure 3:
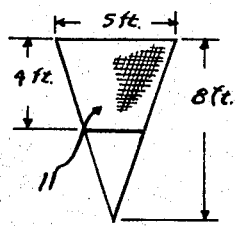
FIG. 3 shows a side view, with dimensions, of a mesh panel.

Assuming the dimensions depicted by the panel 11 shown in FIG. 3, and an X-band radar illuminating the four corner structure, the theoretical radar cross section ($\Sigma$) approaches:

$$\Sigma = \frac{4\pi A^2}{\lambda^2}$$

where A is the area of the panel and $\lambda$ is the wavelength of the radar. The cross section has a value of about $$1 \times 10^4 \text{ m.}^2$$

to about $2 \times 10^4$ m.² where m.² is the area of the panel in square meters.

Estimating the reduction of the theoretical radar cross section a practical application by a factor of 10 to 20, the effective radar cross section will still be on the order of several 100 m.². This compares very favorably with the radar cross section of aircraft which, as a rule, lies between about 20 m.² and 80 m.².

A pattern distortion results from (1) the transparency of mesh and (2) the fact that the mesh is not stretched taut at all times during descent. This pattern distortion is desirable since it widens the vertical reflection beam. A rescue aircraft may be 5,000 feet higher or lower than the parachute at a distance of 30 miles without significant reduction of received signal strength.

Figure 4:
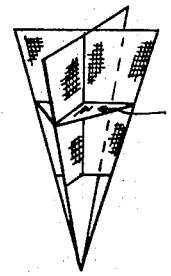
FIG. 4 shows crossed panels with a third panel perpendicular to the parachute axis.

If desired, a third plane perpendicular to the parachute axis may be inserted as shown by 9 of FIG. 4. This approach results in a structure consisting of three-dimensional corner reflectors and represents a strong radar target.

Figure 5:
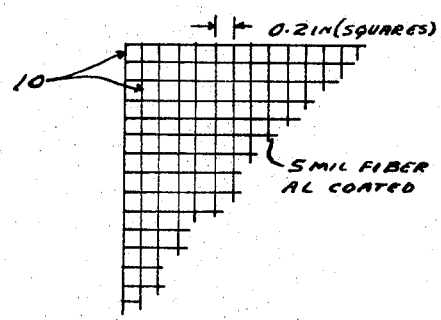
FIG. 5 shows a small section of the mesh with dimensions.

Lightweight mesh is used in making the invention. Thus, negligible weight and bulk is added to the parachute pack. A small section of the mesh structure, with suitable dimensions, is shown in FIG. 5. The fibers 10 may be made of nylon or any other lightweight material and coated with such metals as aluminum, copper, silver, and so forth. The coating of metal should be only a few angstroms thick. Nylon webbing, coated with a thin coat of aluminum, having the dimensions of FIGS. 3 and 5 will add less than two ounces to the pack and the folded volume of the crossed mesh will not exceed 6 cubic inches. The mesh is attached to the shroud lines with lightweight nylon cord.

We claim:

1. In combination with a parachute having a canopy and shroud lines extending from the canopy for supporting a load, a reflective device for radio waves comprising:
   (a) two panels of conductive mesh intersecting at right angles along a line parallel to the parachute axis, each panel extending between and supported by two diametrically opposite shroud lines; and
   (b) a third panel of conductive mesh intersecting the first two panels, said third panel being normal to the line of intersection of said first panels and passing through a point on said line intermediate its ends.

2. A reflective device according to claim 1 wherein said panels of conductive mesh are nylon coated with a metal selected from the group consisting of aluminum, copper, and silver.

3. In combination with a parachute having a canopy and shroud lines extending from the canopy for supporting a load, a reflective device for radio waves comprising two panels of conductive mesh intersecting at right angles along a line parallel to the parachute axis, each panel extending between and supported by two diametrically opposite shroud lines, wherein said panels of conductive mesh are nylon coated with a metal selected from the group consisting of aluminum, copper, and silver.

References Cited

UNITED STATES PATENTS

| | | | |
|---|---|---|---|
| 2,350,480 | 6/1944 | Swofford | 244—142 |
| 2,432,920 | 12/1947 | McKay et al. | 244—142 X |
| 2,450,417 | 10/1948 | Bossi | 9—8 |

FOREIGN PATENTS 497,448  12/1938  Great Britain.

MILTON BUCHLER, Primary Examiner

J. E. PITTENGER, Assistant Examiner